United States Patent [19]

Vanaschen et al.

[11] Patent Number: 5,022,907
[45] Date of Patent: Jun. 11, 1991

[54] APPARATUS FOR BENDING GLASS PANES IN A HORIZONTAL POSITION

[75] Inventors: Luc Vanaschen, Eupen; Herbert Radermacher, Raeren, both of Belgium; Hans-Werner Kuster, Aachen, Fed. Rep. of Germany

[73] Assignee: Saint-Gobain Vitrage International, Courbevoie, France

[21] Appl. No.: 574,820

[22] Filed: Aug. 30, 1990

[30] Foreign Application Priority Data

Sep. 1, 1989 [DE] Fed. Rep. of Germany ....... 3928968

[51] Int. Cl.$^5$ .................................... C03B 23/023
[52] U.S. Cl. .................................... 65/163; 65/289; 65/374.12
[58] Field of Search ................. 65/106, 163, 273, 287, 65/289, 374.12

[56] References Cited

U.S. PATENT DOCUMENTS

| | | | |
|---|---|---|---|
| 3,459,521 | 8/1969 | Nedelec | 65/289 |
| 4,318,728 | 3/1982 | Claassen | 65/289 |
| 4,743,285 | 5/1988 | McKelvey | 65/273 |
| 4,918,946 | 4/1990 | Vanaschen et al. | 65/273 |

Primary Examiner—Joye L. Woodard
Attorney, Agent, or Firm—Oblon, Spivak, McClelland, Maier & Neustadt

[57] ABSTRACT

In an installation for bending glass panes, the glass panes are heated to bending temperature in a horizontal once-through furnace. At the end of the once-through furnace, they are taken over by an endless conveyor belt and are conveyed by this conveyor belt into the bending station, where they are bent together with the conveyor belt. The bent glass pane is conveyed of the conveyor belt into the succeeding cooling or tempering station. In order to support the bent glass pane over the largest possible area, an upper deflector roll for the conveyor belt, disposed at the exit end from the bending station, has a form corresponding to the transverse bend of the glass pane. A lower deflector roll, following the upper deflector roll, has a form complementary to the form of the upper deflector roll. In this way the relative changes in length of the conveyor belt caused by the upper deflector roll are compensated.

11 Claims, 2 Drawing Sheets

APPARATUS FOR BENDING GLASS PANES IN A HORIZONTAL POSITION

BACKGROUND OF THE INVENTION

1. Field of the Invention

The present invention relates to an apparatus for bending glass panes in a horizontal position, comprising a bending mold disposed above the conveying plane for the glass panes and an endless conveyor belt, consisting of a heat-resistant flexible material and guided over deflector rolls, which conveys the glass pane heated to a bending temperature from the furnace to the bending mold and from the bending mold to the cooling or toughening station.

2. Description of the Related Art

An apparatus of this type is known from DE-AS 14 71 872. In this apparatus, a height-adjustable frame bending mold is disposed beneath the upper side of the endless conveyor belt, which bending mold, by raising, presses the conveyor belt together with the glass pane resting thereon against the stationary, upper bending mold. The lower frame bending mold then again descends and the bent glass pane is conveyed onwards on the flat conveyor belt. In order that the pane shall not deform, air nozzles are associated with the upper bending mold which, during the lowering movement of the lower mold, cool the glass pane in order to increase its shape stability. This method is, however, at most possible for relatively thick glass panes having a thickness of more than 6 mm; in the case of thinner glass panes, so much heat is removed by the cooling from the glass pane that subsequent toughening is no longer possible.

An apparatus of the initially named type is also known, wherein a height-adjustable bending mold is disposed also beneath the upper side of the endless conveyor belt, but which, together with the upper bending mold, moves synchronously with the conveyor belt during the pressing operation (U.S. Pat. No. 4,318,728). In this case the conveyor belt is held flat, and the glass pane lies, after bending, only along linear zones on the flat conveyor belt, so that in this case a considerable risk of deformation of the bent glass pane due to the action of its self-weight exists.

SUMMARY OF THE INVENTION

Accordingly, an object of the present invention is to construct an apparatus which reduces or largely prevents the risk of deformation of the bent glass pane when resting on the conveyor belt under the action of its own weight without the temperature of the glass pane being inadmissibly lowered.

According to the present invention, this objective is achieved in that the shape of the upper deflector roll for the endless conveyor belt, disposed at the exit end of the bending station, corresponds to the transverse bend of the bent glass pane, and that the lower deflector roll, following this deflector roll, has a shape complementary to the shape of the upper deflector roll in such a way that the changes in length of the conveyor belt between its central region and its lateral regions, caused by the upper deflector roll, are thereby compensated.

By the construction of the deflector rolls according to the present invention, the result is achieved that the conveyor belt, in the direction orientated transversely to the conveying direction, possesses a curvature largely adapted to the bending mold while still in the actual bending zone, so that the glass pane, after the bending operation, is supported over a large area by the conveyor belt. This large-area support is retained on the further conveying travel to the cooling or toughening station. Since the curvature still further increases along the further travel of the conveyor belt, the supported area still further increases as a consequence on this path. In the immediate region of the upper deflector roll, finally, the glass pane is supported along the entire transverse contact line by the conveyor belt, the transverse bend of which at this position coincides as far as possible with the desired transverse bend of the bent glass pane.

According to a first embodiment of the invention, the upper deflector roll behind the bending station has the form of a hyperbolic paraboloid of rotation, while the succeeding, lower deflector roll also has the form of a paraboloid of rotation, the plane curves forming the rotational surfaces corresponding to each other but having opposite algebraic signs.

In another embodiment of the apparatus according to the present invention, the upper and the succeeding lower deflector roll behind the bending station each consist of a round bar, bent according to the transverse curvature of the glass pane, on which bar there is mounted a torsionally stiff but flexible sleeve which can be set in rotation. In this case, for the two relevant deflector rolls, two identically bent round bars are advantageously used as rotation cores for the hose-like sleeves. By changing the spatial angular position it is possible, in a simple manner, to change the radius of the transverse bend of the conveyor belt within comparatively wide limits.

Accordingly, the present invention relates to an apparatus for bending glass panes in a horizontal position, comprising a bending mold disposed above a conveying level for the glass panes and within a bending station; and an endless conveyor belt for conveying the glass panes heated to a bending temperature from a furnace to the bending station and from the bending station to a cooling station. The endless conveyor belt is made from a heat-resistant, flexible material and is guided over deflector rolls, the deflector rolls comprising at least an upper deflector roll disposed at an exit end of the bending station and a lower deflector roll. The shape of the upper deflector roll corresponds to a transverse bend of the bent glass pane, and the lower deflector roll which follows the upper deflector roll has a shape which is complementary to the shape of the upper deflector roll for compensating for relative differences in length of the conveyor belt between its middle zone and its edge zones resulting from the upper deflector roll.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
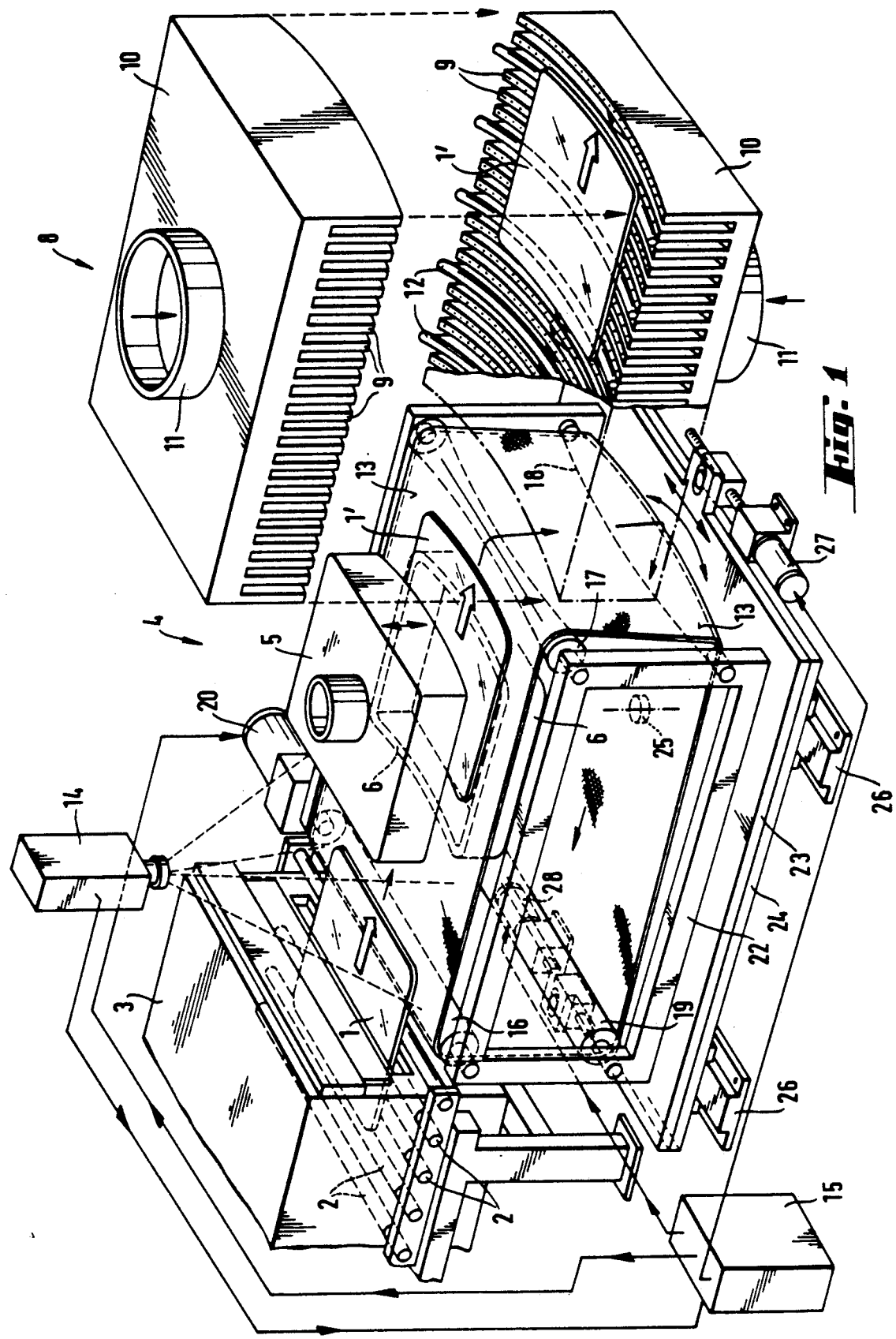
FIG. 1 shows an apparatus constructed according to the present invention, with deflector rolls formed in the shape of paraboloids of rotation.

Referring to FIG. 1, the glass panes 1 are conducted on driven conveying rollers 2 through a conventional roller once-through furnace 3, in which they are heated to bending temperature.

The roller once-through furnace 3 is adjoined by a bending station 4. In the bending station 4, above the conveying plane for the glass panes, a bending mold 5 having a downwardly orientated, convex, solid forming surface is disposed. The bending mold 5 is mounted to be movable in a known manner in a vertical direction. Beneath the conveying plane for the glass panes, a counter-mold, formed as an annular or frame mold 6, is mounted either stationary or also displaceable in a vertical direction.

The bending station is followed by a cooling or toughening station 8, into which the bent glass panes 1' enter immediately after the bending operation and in which, in the case illustrated here, they are toughened by abrupt cooling. The abrupt cooling is effected by means of blowing chests 10 having nozzle pipes or nozzle ribs 9, these chests being supplied with the necessary blowing air through air feed lines 11. In the region of the toughening station 8, the glass panes are conveyed on conveying shafts 12, which may be adapted to the shape of the glass panes.

The endless conveyor belt 13 of a heat-resistant, flexible fabric serves for conveying the glass panes from the exit of the roller furnace 3 into the bending station 4. During the bending process, the glass pane remains on the conveyor belt 13. The actual bending operation takes place in that the glass pane 1 is positioned by means of the conveyor belt 13 accurately underneath the bending mold 5, and immediately after the positioning of the glass pane the bending mold 5 is lowered onto the glass pane 1.

For positioning the glass pane 1 underneath the bending mold 5, the accurate position of the glass pane 1 on the conveyor belt 13 before the bending mold 5 is reached is determined by means of a video camera 14. The signals supplied by the video camera 14 are evaluated in a data processing unit 15, illustrated schematically. From this data processing unit 15, on the one hand, the drive motor 20 is controlled, which moves the conveyor belt 13 onwards through the distance calculated by the data processing unit 15. In addition, further drive motors can be controlled by the data processing unit 15, by which the conveyor belt 13 is displaced in the transverse direction and/or in its angular position, so that a complete alignment of the glass pane 1 in all directions within the bending station is obtained. The apparatus for aligning the conveyor belt 13 in the transverse direction is described later in greater detail.

Where the curvature to be imparted to the glass pane is only small, a counter-mold underneath the conveyor belt 13 is not necessary, but indeed in such cases the counter-forces exerted by the tightened conveyor belt 13 are sufficient for pressing the glass pane against the molding surface of the bending mold 5. Where the curvature is more pronounced, in contrast, the use of a lower counter-mold is advisable. This counter-mold may be mounted fixed just underneath the conveyor belt 13, so that the upper bending mold 5, as it is lowered, presses the glass pane 1 together with the conveyor belt 13 against the lower counter-mold, which consists of a frame bending mold 6.

It is, however, also possible to carry out the actual pressing operation by the upper bending mold 5 and lower frame bending mold 6 being moved towards each other, or by the upper bending mold 5 being stationarily mounted and only the lower frame bending mold 6 being movable in a vertical direction, and pressing the conveyor belt 13 together with the glass pane against the upper bending mold 5.

The endless conveyor belt 13 is conducted in a circuit around four deflector rolls 16, 17, 18 and 19. These deflector rolls can be driven by one common drive motor 20. The drive motor 20 is, as already mentioned, controlled by the data processing device 15, which not only makes possible the accurate positioning of the glass panes within the bending station 4, but also allows the glass pane to be conveyed after the bending operation at increased speed into the toughening station 8, and to be adjusted accurately to the conveying speed of the conveying rollers 2 when a glass pane is taken over from the conveying rollers 2 of the once-through furnace 3, in order to avoid sliding relative movements between the glass pane on the one hand and the conveying rollers 2 or conveyor belt 13 on the other hand.

As materials for the conveyor belt 13, woven fabrics of glass fibers or wovens or knitted fabrics of fibers of a heat-resistant and corrosion-resistant metal, for instance, are suitable. Particularly suitable for this purpose are knitted fabrics of filaments, of which the elementary fibers are of a heat-resistant, chrome-nickel alloy and have a diameter of less than 50 micrometers and preferably less than 20 micrometers. Metal fiber fabrics of this class are described in EP 0 312 439. Knitted or woven fabrics of this type not only possess the necessary heat resistance, but also have the necessary mechanical strength and the required thermal insulation properties, and furthermore exhibit sufficient elasticity and deformability to adapt to the bending molds and the deflector rolls.

Whereas the two deflector rolls 16 and 19 at the end of the conveyor belt 13 nearest the once-through furnace 3 are cylindrical rolls, the upper deflector roll 17 at the exit from the bending station 4 has the shape of a hyperbolic paraboloid of rotation, that is to say its circumference is formed of a surface of rotation which results from rotation about the axis of rotation of the deflector roll 17 of a plane curve corresponding to the transverse curvature of the glass pane. The deflector roll following the deflector roll 17, namely the lower deflector roll 18, also has the form of a paraboloid of rotation, but with the opposite algebraic sign, that is to say its circumferential surface is formed of the surface of rotation which results from rotation of a curve corresponding to the curvature of the glass pane, but with the plane curve corresponding to the transverse curvature having been rotated through 180°. In this manner, the differences in length between the central zone of the conveyor belt 13 and its lateral zones resulting from the varying diameter of the upper deflector roll 17 are compensated.

The deflector rolls 16 to 19, and thus the conveyor belt 13, are mounted as a whole including the drive motor 20 in a frame 22, which is mounted on a plate 23. The plate 23 rests, through suitable bearings, on the plate 24 parallel thereto and is connected to the latter by a centrally located pivot bearing 25, so that the plate 23 can execute angular displacement movements about the axis of the pivot bearing 25. The lower plate 24 is displaceably mounted in a direction transverse to the longitudinal axis of the apparatus, by a suitable bearing system on rails 26. The drive in the transverse direction is provided by drive motors 27, 28. These drive motors 27, 28 are also governed from the data processing device 15 in accordance with the position signals supplied by the video camera 14. By different amounts of adjustment of the two drive motors 27 and 28, the plate 23 can also execute an angular displacement, so that by these two drive motors an exact angular alignment of the glass pane 1 and an adjustment in the transverse direction can be effected.

Figure 2:
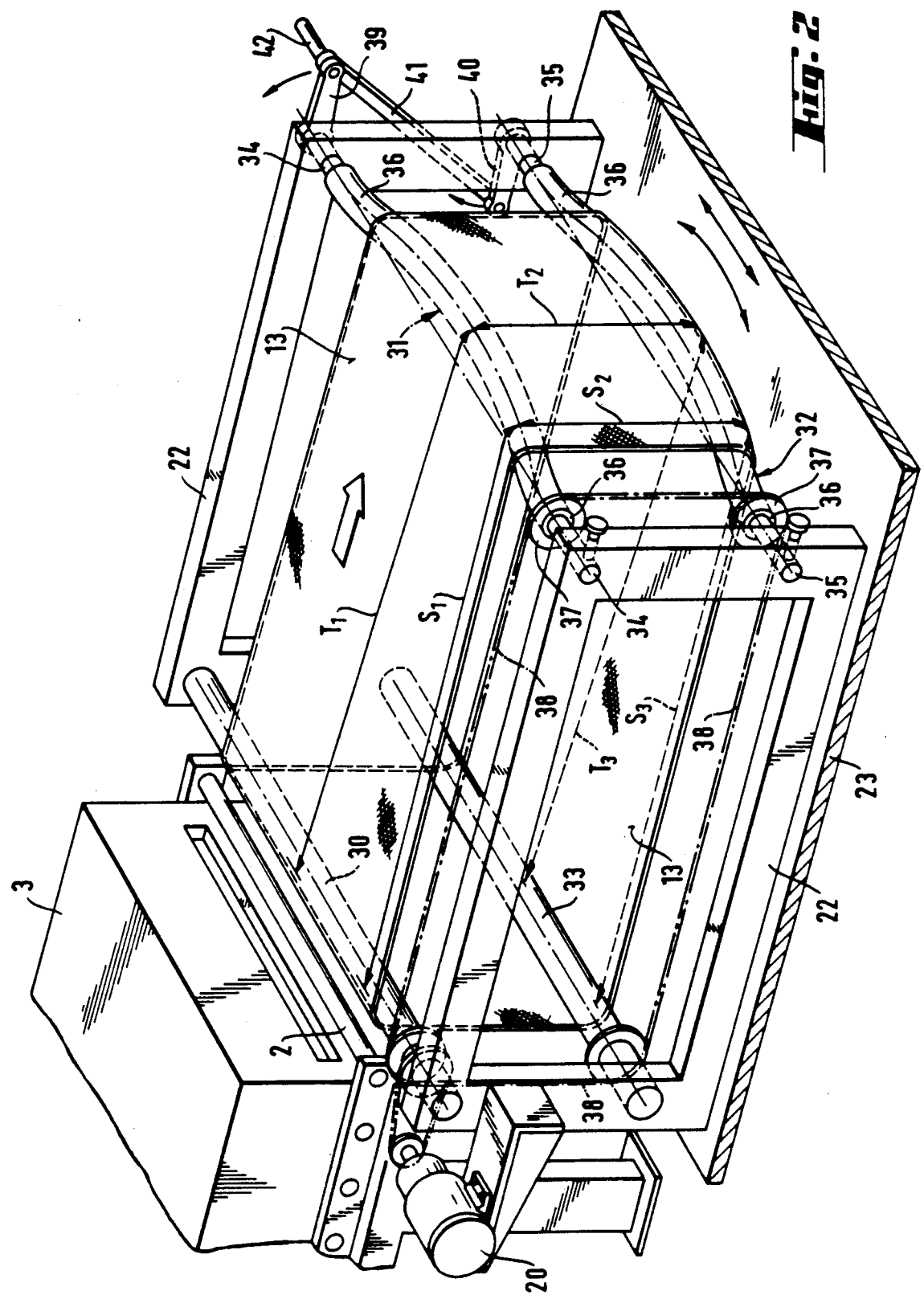
FIG. 2 shows an apparatus constructed according to the present invention, with deflector rolls which each consist of a bent round bar and of a flexible sleeve, revolving on the bent round bar.

In FIG. 2, a different embodiment for guiding the conveyor belt 13 is illustrated. In this embodiment, the endless conveyor belt 13 is again conducted around four deflector rolls 30 to 33, of which the two deflector rolls 30 and 33 nearest the once-through furnace are circular cylindrical rolls. The two deflector rolls 31 and 32, disposed at the exit from the bending station, each consist of a rotatably journalled round bar 34, 35 respectively, the central portions of which are each curved to the same radius of curvature. On each of the round bars 34, 35, a flexible, but torsionally stiff hose-like sleeve 36 is disposed, with each of which a toothed wheel 37 is connected. The sleeves 36 are given a rotational movement through these toothed wheels 37 by a chain 38, while the bent round bars 34 and 35 are secured in their spatial angular orientation. The sleeves 36 are, in this manner, driven by the drive motor 20, simultaneously with the deflector rolls 30 and 33 and at the same circumferential speed as the latter.

The construction of the deflector rolls 31 and 32 corresponds, for example, to the construction of the apparatus described in EP 0 107 565, to which reference is made in this respect.

The spatial angular orientation of the curved round bars 34 and 35 is so adjusted that the sum of the partial distances $S_1+S_2+S_3$ is equal to the sum of the partial distances $T_1+T_2+T_3$, so that the differences in the distances $S_1$ and $T_1$ are compensated by the differences in the distances $S_3$ and $T_3$ in the opposite sense.

By means of the deflector rolls consisting of the curved round bars and sleeves 36 revolving about them, a variable transverse curvature can be imparted to the conveyor belt, corresponding to the spatial angular orientation of the upper, curved round bar 34, so that the conveyor belt can be adapted to different shapes of pane without the deflector rolls needing to be replaced. The transverse curvature of the conveyor belt 13 can be varied from the radius $\infty$, that is from the plane condition, as far as the radius of curvature of the curved central portion of the round bar 34. The horizontal angular position of the curved part of the round bar 34 corresponds to the plane condition of the conveyor belt 13, whereas the vertical angular position of the curved part of the round bar 34 corresponds to the maximum transverse curvature.

With the vertical orientation of the curved central portion of the round bar 34, illustrated in FIG. 2, the lower, curved round bar 35 is also orientated vertically downwards, that is it is orientated in the same angular setting as the upper round bar 34. If the upper curved round bar 34 is orientated horizontally, the lower round bar 35 is also orientated horizontally, but rotated through 180° with respect to the upper round bar 34, in order to achieve the desired compensation effect. In the angular region between the horizontal and the vertical alignments of the two curved round bars 34 and 35, the angular position of the two round bars must be carried out in mutually opposite directions of rotation. The two round bars 34 and 35 can be coupled to each other in their rotational movement in the above-described sense by crank arms 39, 40 and a lever 41 connecting the two crank arms 39, 40 together, so that when the transverse curvature of the conveyor belt is changed by means of the handle 42, the desired compensation is automatically achieved.

The construction illustrated in FIG. 2 can, like the construction described with reference to FIG. 1, be mounted in a frame 22 and can be adjustable by means of this frame 22 in the transverse direction and, if required, also in its horizontal angular orientation, in order thereby to make possible accurate positioning of the glass pane 1 as described in FIG. 1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Apparatus for bending glass panes in a horizontal position, comprising:
   a bending mold disposed above a conveying level for the glass panes and within a bending station; and
   an endless conveyor belt for conveying the glass pane heated to a bending temperature from a furnace to the bending mold and from the bending mold to a cooling station, said endless conveyor belt being made from a heat-resistant, flexible material and being guided over deflector rolls, said deflector rolls comprising at least an upper deflector roll disposed at an exit end of said bending station and a lower deflector roll which follows the upper deflector roll, wherein the shape of the upper deflector roll corresponds to a transverse bend of the bent glass pane, and the lower deflector roll which follows the upper deflector roll has a shape which is complementary to the shape of the upper deflector roll for compensating for relative differences in length of the conveyor belt between its middle zone and its edge zones resulting from the upper deflector roll.

2. Apparatus according to claim 1, wherein the upper deflector roll and the lower deflector roll each have the form of a paraboloid of rotation with opposite signs.

3. Apparatus according to claim 1, wherein the upper deflector roll and the lower deflector roll each comprise a round bar having a bent central portion, and a hose-like sleeve of a flexible, torsionally stiff material, rotatably journalled on the round bar.

4. Apparatus according to claim 3, wherein said deflector rolls further comprise circular cylindrical deflector rolls located at the end of the conveyor belt nearest the furnace, and wherein the hose-like sleeves can be driven at the same circumferential speed as the circular cylindrical deflector rolls.

5. Apparatus according to one of claims 3 or 4, wherein the bent round bars of the upper and lower deflector rolls are mounted to be angularly adjustable.

6. Apparatus according to claim 5, wherein the bent round bars are coupled together in mutually opposed directions of rotation.

7. Apparatus according to claim 6, comprising a drive motor for the conveyor belt, an optical device for detecting the position of the glass pane on the conveyor belt, and a data processing device for evaluating signals from the optical device and governing the drive motor for positioning the glass panes in the bending station.

8. Apparatus according to claim 7, wherein all of said deflector rolls are each disposed on a common frame which is displaceably mounted in a direction transversely to a longitudinal axis of the conveyor belt.

9. Apparatus according to claim 8, comprising further drive motors for displacing the frame in the transverse direction, said further drive motors being governed by said data processing device which evaluates signals for the positioning of the glass pane in the bending station coming from said optical device which detects the position of the glass pane on the conveyor belt.

10. Apparatus according to claim 9, wherein the frame is mounted to be adjustable in angle.

11. Apparatus according to claim 10, wherein the conveyor belt is of a woven or knitted fabric of threads, the elementary fibers of which are of a chrome-nickel alloy and have a diameter of less than 50 micrometers.

* * * * *